United States Patent
Huang et al.

(10) Patent No.: US 8,218,702 B2
(45) Date of Patent: Jul. 10, 2012

(54) SYSTEM AND METHOD OF ADAPTING PRECURSOR TAP COEFFICIENT

(75) Inventors: Dawei Huang, San Diego, CA (US); Deqiang Song, San Diego, CA (US); Jianghui Su, San Jose, CA (US); Drew G. Doblar, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 699 days.

(21) Appl. No.: 12/388,223

(22) Filed: Feb. 18, 2009

(65) Prior Publication Data

US 2010/0208855 A1    Aug. 19, 2010

(51) Int. Cl.
*H04L 7/00* (2006.01)

(52) U.S. Cl. ........ 375/354; 375/295; 375/296; 375/316; 375/346; 375/348; 375/229; 375/232; 375/233

(58) Field of Classification Search ............. 375/354, 375/295, 296, 316, 346, 348, 229, 232, 233
See application file for complete search history.

(56) References Cited

U.S. PATENT DOCUMENTS

| | | | |
|---|---|---|---|
| 5,402,448 A | 3/1995 | Marko et al. | |
| 6,194,969 B1 | 2/2001 | Doblar | |
| 6,219,395 B1 | 4/2001 | Pollack et al. | |
| 6,516,422 B1 | 2/2003 | Doblar et al. | |
| 6,614,862 B1 | 9/2003 | Doblar | |
| 6,731,667 B1 | 5/2004 | Lee et al. | |
| 6,937,680 B2 | 8/2005 | Fong et al. | |
| 7,277,477 B1* | 10/2007 | Ahmad | 375/220 |
| 7,447,278 B2* | 11/2008 | Menolfi et al. | 375/340 |
| 2005/0207485 A1* | 9/2005 | Lai | 375/233 |
| 2007/0019773 A1 | 1/2007 | Zhou | |
| 2008/0075160 A1* | 3/2008 | Yamaguchi | 375/233 |
| 2008/0260016 A1* | 10/2008 | Lapointe et al. | 375/233 |
| 2010/0177816 A1* | 7/2010 | Malipatil et al. | 375/233 |

OTHER PUBLICATIONS

"Designing Bang-Bang PLLs for Clock and Data Recovery in Serial Data Transmission Systems"; Richard C. Walker, Agilent Laboratories, Palo Alto, CA; pp. 1-12, IEEE Press, Feb. 2003.

(Continued)

*Primary Examiner* — Siu Lee
(74) *Attorney, Agent, or Firm* — Rory D. Rankin; Meyertons, Hood, Kivlin, Kowert & Goetzel, P.C.

(57) ABSTRACT

A system and methods for recovering data from an input data signal are disclosed. The system includes a transmitter for conveying a data signal filtered by a finite impulse response (FIR) filter to a receiver via a channel. The receiver uses an adaptive algorithm to determine update signals for a pre-cursor tap coefficient of the FIR based on samples taken from the received data signal and conveys the update signals to the FIR. To generate update signals, the receiver samples the data signal at a phase estimated to correspond to a peak amplitude of a pulse response of the channel. The phase is based on a clock recovered from the data signal. The update signals increase or decrease a pre-cursor tap coefficient setting in response to determining that the phase corresponds to a point earlier or later, respectively, than the peak amplitude of the channel's pulse response.

20 Claims, 7 Drawing Sheets

OTHER PUBLICATIONS

"A Second-Order Semi-Digital Clock Recovery Circuit Based on Injection Locking"; M.-J. Edward Lee, William J. Dally, John Poulton, Trey Greer, John Edmondson, Ramin Farjad-Rad, Hiok-Tiaq Ng, Rohit Rathi, and Ramesh Senthinathan; Vilio Communications, Milpitas, CA & Stanford University, Stanford, CA; ISSCC 2003/Session 4/Clock Recovery and Backplane Transceivers/ Paper 4.3; ©2003 IEEE International Solid-State Circuits Conference.

"Computationally Efficient Version of the Decision Feedback Equalizer"; Gupta, R., Kiran, Lee, Edward A., University of California, Berkley; Acoustics, Speech, and Signal Processing, 1999. ICASSP apos;99. Proceedings., 1999 IEEE International Conference; vol. 3, Issue, Mar. 15-19, 1999 pp. 1257-1260.

"Decision-Feedback Equalization of Pulse-Position Modulation on Measured Nondirected Indoor Infrared Channels"; Audeh, Malik D., Kahn, Joseph M., and Barry, John R.; IEEE Transactions on Communications, vol. 47, No. 4, Apr. 1999; pp. 500-503.

"Timing Recovery in Digital Subscriber Loops"; Agazzi, Oscar, Tzeng, Chin-Pyng Jeremy, Messerschmitt, David G., and Hodges, David A.; IEEE Transactions on Communications, vol. Com-33, No. 6, Jun. 1985, pp. 558-569.

"Matched Filtering and Timing Recovery in Digital Receivers"; Litwin, Louis; RF Time and Frequency; www.rfdesign.com ; Sep. 2001; pp. 32-48.

* cited by examiner

SYSTEM AND METHOD OF ADAPTING PRECURSOR TAP COEFFICIENT

BACKGROUND OF THE INVENTION

1. Field of the Invention

This invention relates to clock and data recovery circuits and, more particularly, to techniques for clock and data recovery.

2. Description of the Related Art

High-speed data communication systems frequently rely on clock and data recovery (CDR) circuits within the receiver instead of transmitting a reference clock with the data. The CDR extracts a clock that is embedded in the incoming data stream. Once a clock is recovered, it is used to sample the incoming data stream to recover the individual bits. A variety of clock recovery circuits are well known, including phase-locked loops (both analog and digital) and delay lock loops. Regardless of the circuit used, a clock recovery circuit attempts to extract the frequency and phase of the clock from a data stream.

During propagation, data signals may experience distortion due to bandwidth limitations, dispersion, etc. in the communication channel. These effects cause a spreading of signal pulse energy from one symbol period to another. The resulting distortion is known as inter-symbol interference (ISI). Generally speaking, ISI becomes worse as the speed of communication increases. As a result, high-speed communication systems often incorporate circuitry to equalize the effects of ISI. One technique for reducing the effect of ISI is to use a Finite Impulse Response (FIR) filter in the transmitter to equalize the signal before transmitting it through the communication channel. Various parameters of the FIR determine the effect the FIR has on the signal. Various properties of the communications channel determine the appropriate settings of these FIR parameters. For example, signals passing through a communication channel may be affected by electrical properties as well as the temperature and humidity of the channel. Some of these properties may vary during operation, suggesting a need to vary FIR parameters during operation to maintain proper ISI equalization, particularly at high communication speeds.

In addition to the above considerations, proper functioning of the data receiver requires that the CDR recover a stable clock. To recover a stable clock, one type of CDR uses an algorithm known as the Muller-Mueller algorithm. Performance of the Muller-Mueller algorithm is improved if the received signal is equalized before being sampled. Theoretically, equalization may be improved by taking measurements of the pulse response of the communication channel in real time during high-speed communication and using them to set FIR parameters. However, capturing measurements of the channel's pulse response during high-speed operation is problematic. Theoretically, the height of the pulse response may be estimated at various points in time and these estimates used to determine settings of the FIR. For example, an estimate of the pulse height at the peak of the pulse may be referred to as the cursor height, an estimate of the pulse height one unit interval prior to the peak of the pulse may be referred to as the pre-cursor height, and an estimate of the pulse height one unit interval after the peak of the pulse may be referred to as the post-cursor height, where a unit interval is the time between successive symbols in the channel. A FIR may be constructed with three tap coefficients that correspond to the pre-cursor, cursor, and post-cursor heights. In most implementations of the Muller-Mueller algorithm, a locking position of the recovered clock phase occurs for a pre-cursor height of zero. Consequently, it is not possible to use a zero-forcing algorithm to adapt the pre-cursor tap coefficient. Unfortunately, using a pre-cursor tap coefficient value of zero may not produce optimum equalization or result in the cursor being at the peak of the pulse response. In view of the above considerations, systems and methods of efficiently adapting equalization values such as the FIR coefficients are desired.

SUMMARY OF THE INVENTION

Various embodiments of a system and methods for recovering data from an input data signal are disclosed. In one embodiment, a data communications system includes a transmitter for conveying a data signal filtered by a finite impulse response (FIR) filter to a receiver via a channel. The receiver receives the filtered data signal, update signals for a pre-cursor tap coefficient of the FIR filter, and conveys the update signals to the FIR. To determine the update signals, the receiver includes circuitry to generate update signals based on one or more samples taken from the received data signal. The circuitry uses an adaptive algorithm to determine a sign of the update signals based on a slope at a locking point of a pulse response of a channel via which the data signal is received, wherein the locking point is estimated to correspond to a peak amplitude of the pulse response.

In one embodiment, the receiver includes a clock recovery unit configured to recover a clock from the data signal received via the channel. To generate update signals, the circuitry samples the data signal at a phase estimated to correspond to a peak amplitude of a pulse response of the channel. The phase is based on the recovered clock. In a further embodiment, the update signals increase a pre-cursor tap coefficient setting in response to determining that the phase corresponds to a point earlier than the peak amplitude of the pulse response of the channel and decrease a pre-cursor tap coefficient setting in response to determining that the phase corresponds to a point later than the peak amplitude of the pulse response of the channel.

In a still further embodiment, to determine the phase, the circuitry accumulates a series of error measurements taken from the data signal received via the channel. In a still further embodiment, the receiver is integrated into a serializer/deserializer.

While the invention is susceptible to various modifications and alternative forms, specific embodiments are shown by way of example in the drawings and are herein described in detail. It should be understood, however, that drawings and detailed descriptions thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
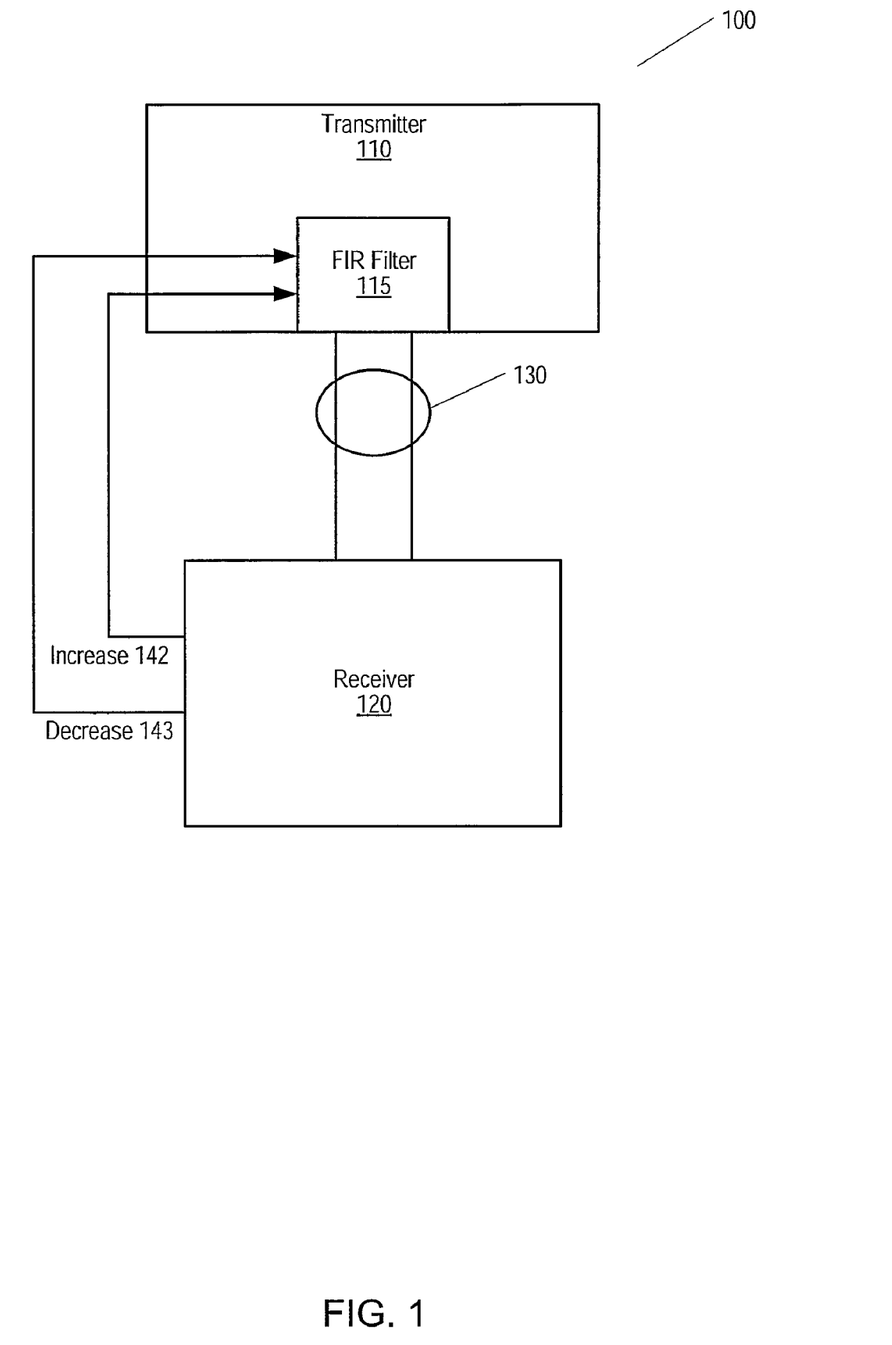
FIG. 1 is a generalized block diagram of one embodiment of a communications system.

FIG. 1 is a generalized block diagram of one embodiment of a communications system 100. System 100 includes a transmitter 110 and a receiver 120 connected by a channel 130. In one embodiment, channel 130 may be a differential channel. Transmitter 110 may include a finite impulse response filter (FIR) 115 that may be used to equalize signals transmitted through channel 130. Receiver 120 may generate signals that are used to set values of parameters within filter 115. For example, in the illustrated embodiment, receiver 120 conveys an increase signal 142 and/or a decrease signal 143 to transmitter 110 that may be used to increase or decrease the value of a precursor tap coefficient within filter 115. Various embodiments of filter 115 and receiver 120 are described below.

Figure 2:
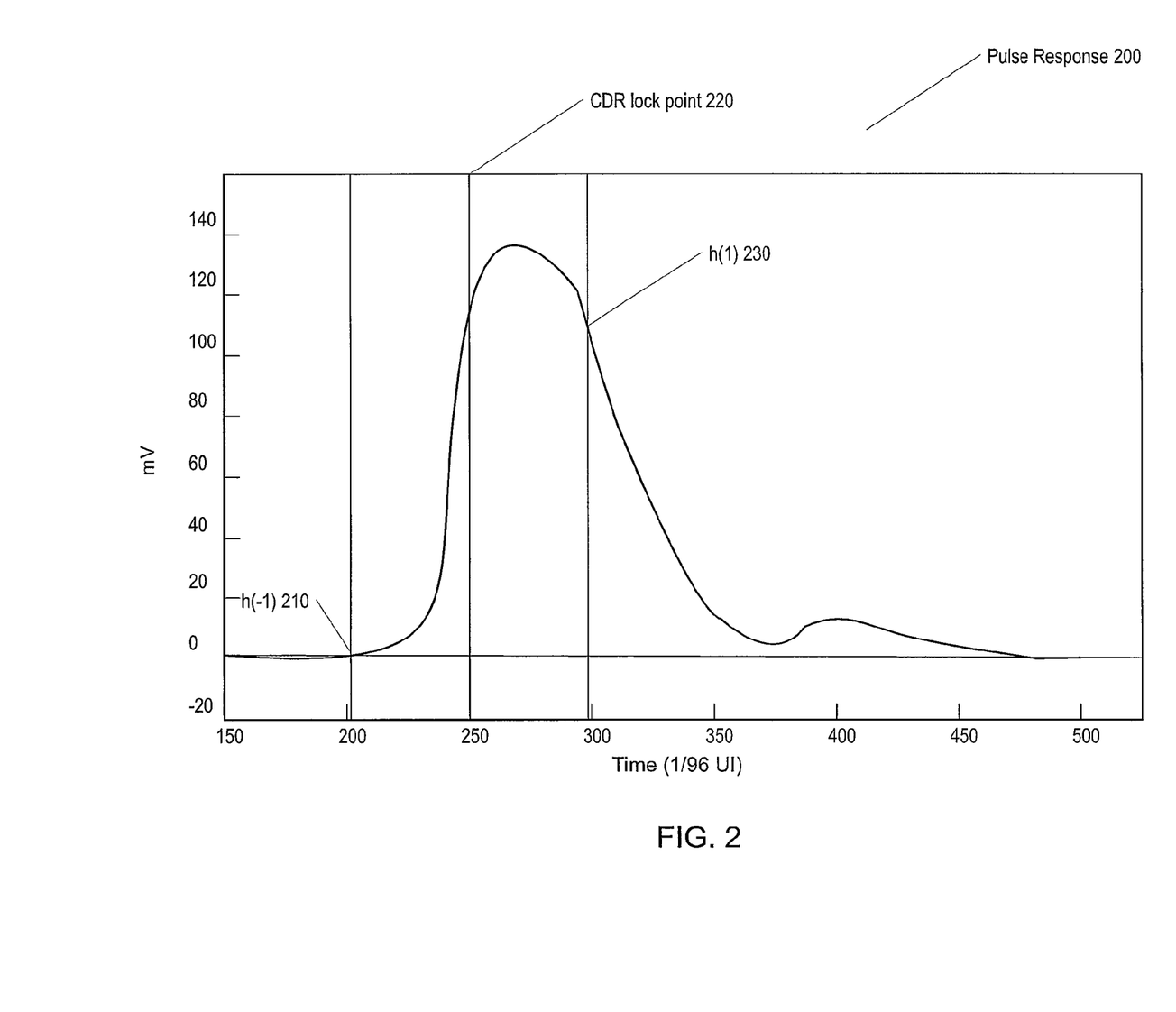
FIG. 2 illustrates a representative pulse response 200 that may be obtained for a pulse transmitted through a differential channel.

During operation, receiver 120 may determine the values of increase signal 142 and decrease signal 143 based on information extracted from a data signal received through channel 130. Before describing the operation of receiver 120, it is useful to illustrate some properties of the pulse response of channel 130. FIG. 2 illustrates a representative pulse response 200 that may be obtained for a pulse transmitted through channel 130. In the illustration, the height in millivolts of the response to a pulse is plotted against time, measured in units of 1/96 unit intervals, where a unit interval is defined as the time between successive symbols in the channel Three points on the pulse response are indicated: a pre-cursor height, h(−1) 210, a CDR lock point 220, and a post-cursor height, h(1) 230. The value of h(−1) 210 is the height of the pulse response sampled one unit interval prior to the point at which the CDR is locked. The CDR lock point 220 is the point in time that the CDR estimates to be the peak of the pulse response. The value of h(1) 230 is the height of the pulse response sampled one unit interval after the point at which the CDR is locked. The illustrated pulse response represents a CDR that uses a Muller-Mueller algorithm to lock the recovered clock phase such that the value of h(−1) 210 is zero. In this example, it may be seen that CDR lock point 220 occurs on the rising edge of pulse response 200, rather than at the exact peak of pulse response 200, reflecting sub-optimum values of the FIR tap coefficients. Generally speaking, the sign of the error signal that may be used to adapt the value of the FIR precursor tap coefficient depends on the slope of the pulse response at CDR lock point 220. In the discussions that follow, systems and methods for adapting the value of FIR tap coefficients, in particular, the FIR precursor tap coefficient will be presented.

Figure 3:
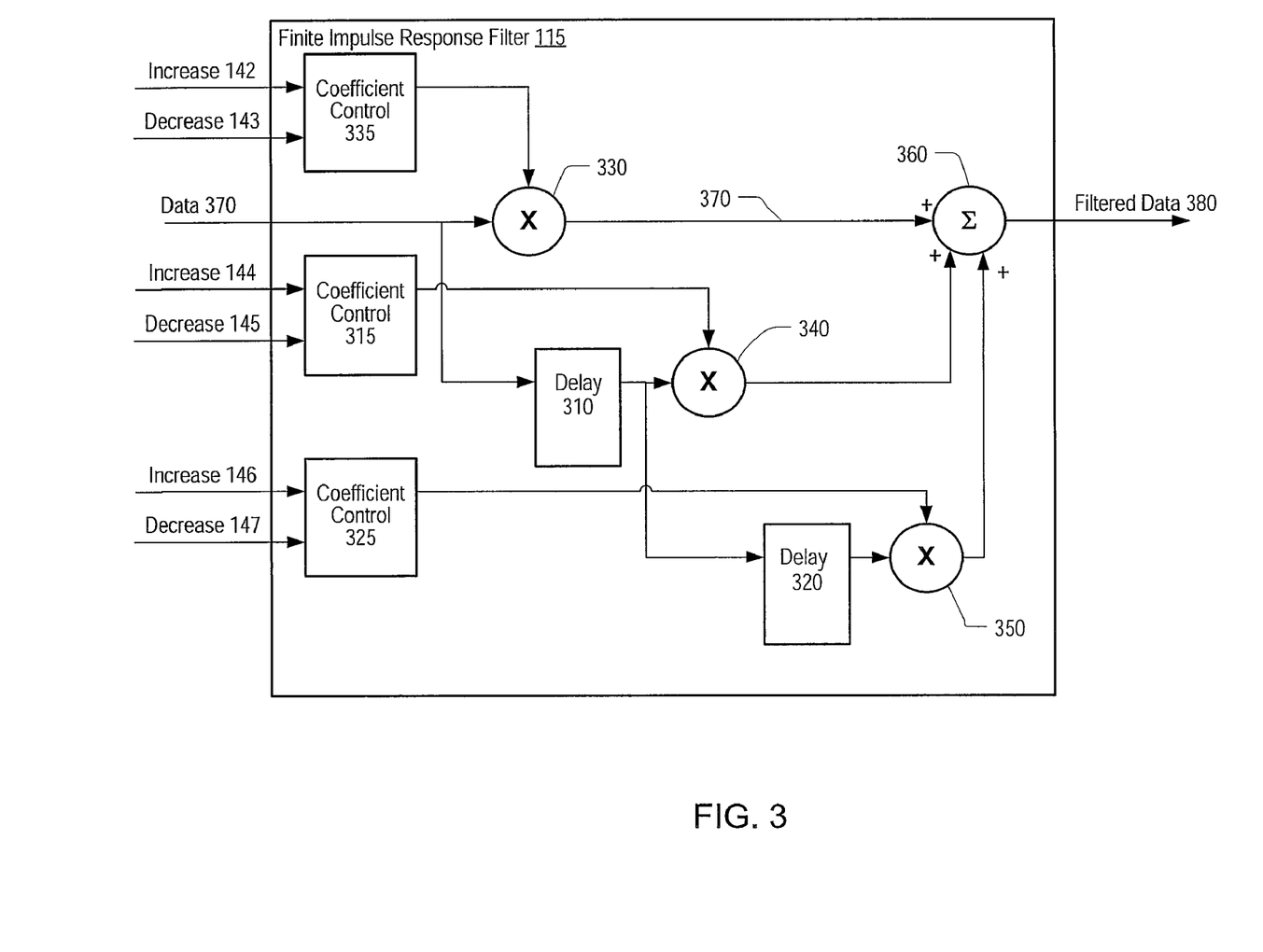
FIG. 3 is a generalized block diagram of one embodiment of a FIR filter.

FIG. 3 is a generalized block diagram of one embodiment of a FIR filter 115. As shown, filter 115 includes delays 310 and 320, multipliers 330, 340, and 350, an adder 360, and coefficient controls 315, 325, and 335. Filter 115 receives data 370 and coefficient control signals 142-147 and outputs filtered data 380. In operation, data 370 is multiplied by a first coefficient in multiplier 330, wherein the first coefficient is determined by coefficient control 335 based on increase signal 142 and decrease signal 143. In addition, data 370 is delayed by a fixed time interval by delay 310 and multiplied by a second coefficient in multiplier 340, wherein the second coefficient is determined by coefficient control 315 based on increase signal 144 and decrease signal 145. The output of delay 310 is delayed further by a fixed time interval by delay 320 and multiplied by a third coefficient in multiplier 350, wherein the third coefficient is determined by coefficient control 325 based on increase signal 146 and decrease signal 147. The first, second, and third coefficients may be referred to as the pre-cursor, cursor, and post-cursor coefficients, respectively. The outputs of multipliers 330, 340, and 350 may be accumulated by adder 360 to produce filtered data 380.

In the embodiment illustrated in FIG. 3, two delays (310 and 320) are shown by way of example only. In alternative embodiments, fewer than two or more than two delays may be included in filter 115. Each delay may be associated with a respective multiplier and coefficient. In various embodiments, signals 142-147 may be provided by the transmitter, the receiver, or some other component (not shown) of communications system 100. The remainder of this application is generally concerned with embodiments in which signals 142 and 143 are provided by the receiver in order to control the value of the pre-cursor coefficient.

Figure 4:
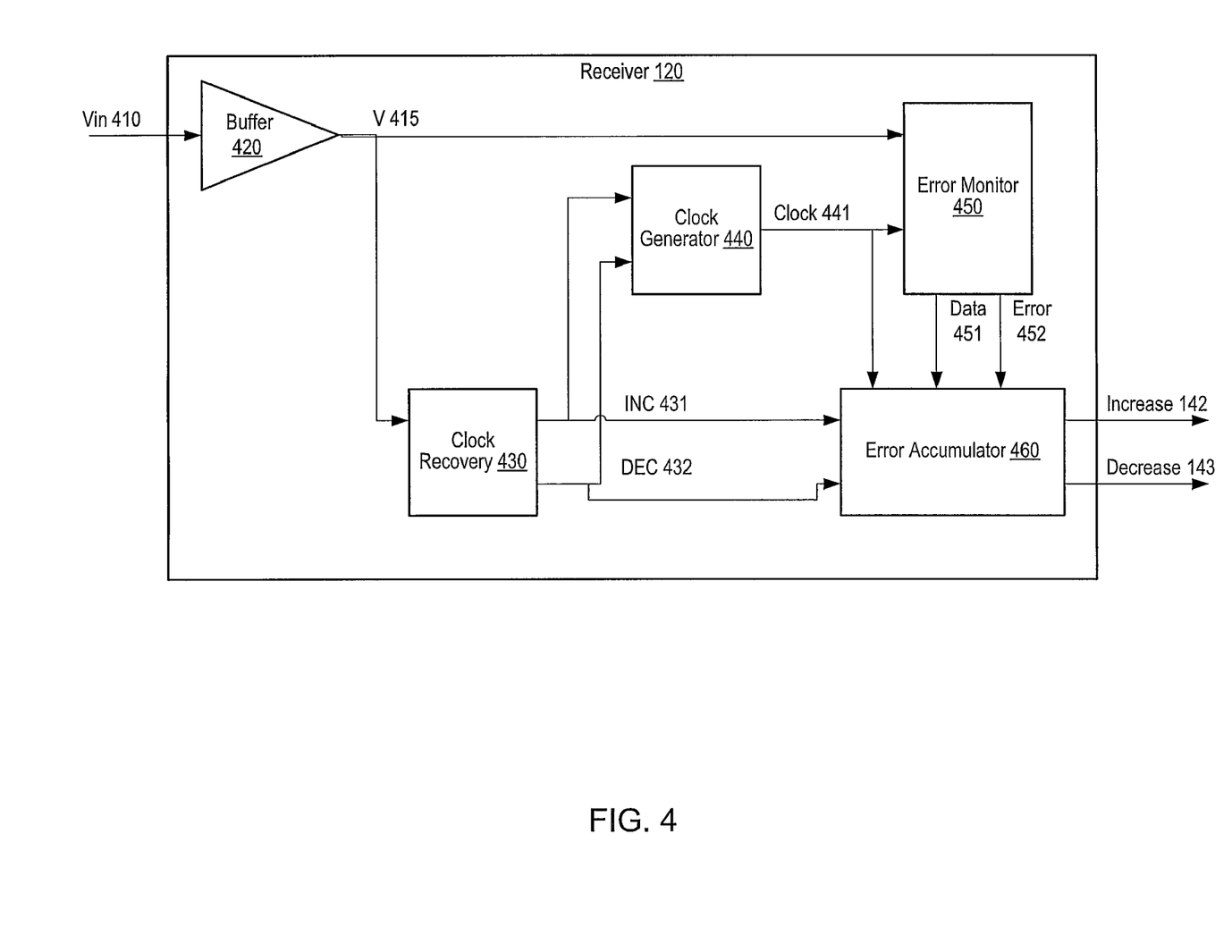
FIG. 4 is a generalized block diagram of one embodiment of receiver.

FIG. 4 is a generalized block diagram of one embodiment of receiver 120. In one embodiment, the receiver is integrated into, or comprises, serializer/deserializer circuitry. As shown, receiver 120 includes a buffer 420, a clock recovery unit 430, a clock generator 440, an error monitor 450, and an error accumulator 460. In operation. buffer 420 receives Vin 410 from the communication channel and outputs a signal V 415 to clock recovery unit 430 and error monitor 450. Clock recovery unit 430 produces signals INC 431 and DEC 432 to increase or decrease the frequency of the recovered clock. INC 431 and DEC 432 are conveyed to clock generator 440 and error accumulator 460. Clock generator 440 generates a clock signal, clock 441. Clock 441 may be conveyed to error monitor 450 where it is used to generate a data signal 451 and an error signal 452. Data signal 451 represents a decision as to whether the current data bit of V 415 is a logic '0' or a logic '1.' Error signal 452 represents a decision as to whether V 415 is greater than or less than a threshold value, which should be equal to the cursor height under steady state conditions. Error signal 452 may, in one embodiment, have values of logic '1' or a logic '0.' In one embodiment, data signal 451 and error signal 452 may be generated by slicing V 415 at a clock phase estimated to be close to the actual data sampling point. Error accumulator 460 may use INC 431, DEC 432, clock 441, data signal 451, and error signal 452 to generate increase and decrease signals 142 and 143 for controlling the pre-cursor tap coefficient of FIR 115. One embodiment of error accumulator 460 is described in further detail below.

A number of alternative embodiments are possible in which receiver 120 includes other components instead of or in addition to those illustrated. Also, each of the illustrated components may include other features not shown. For example, buffer 420 may include an automatic gain control feature such as a voltage-controlled amplifier. Clock recovery unit 430 may include a phase-locked loop and//or other circuitry suitable for recovering a clock signal. Clock generator 440 may generate additional clock outputs that are used in alternative versions of error monitoring circuitry. The relationships among clock 441 and V 415 for the illustrated embodiment of receiver 120 will now be described.

Figure 5:
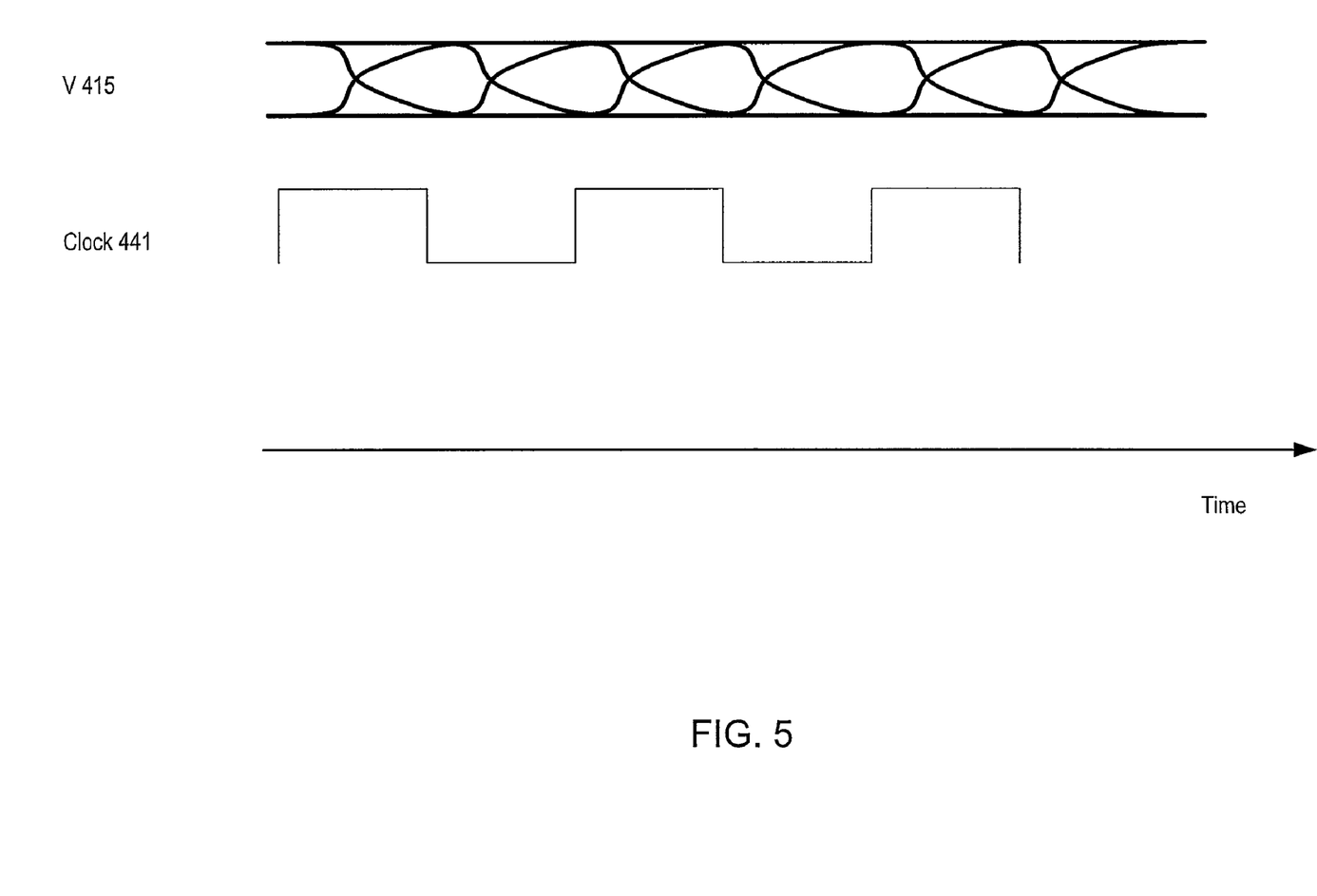
FIG. 5 illustrates one embodiment of data and clock signals used by an error monitor in a data receiver.

FIG. 5 illustrates one embodiment of data and clock signals used by an error monitor in a data receiver. In the illustrated embodiment, V 415 is represented by an overlapping series of pulses that assume values of logic '1' and logic '0' in a random pattern. The phase of clock 441 is set so that a rising edge may sample V 415 in the middle of a pulse. As noted above, clock 441 may be used by error monitor 450 to generate data signal 451 and error signal 452.

Receiver 120 may be configured to produce increase and decrease signals for the FIR pre-cursor tap coefficient based on a variety of algorithms. In theory, the following relationship describes the error information that may be used to determine a value of the pre-cursor tap coefficient:

$$Eint(i)=Eint(i-1)+[e(i-1)*d(i-1)]*[INC-DEC],$$

where Eint(i) is the ith value of the error information integrated over a period of time, e(i) is the error information (1 or −1), d(i) is the value of the current bit (1 or −1) and INC and DEC are the clock recovery update directions. If Eint(i) is positive at the end of the integration period, the value of the FIR pre-cursor tap coefficient may be increased. If Eint(i) is negative at the end of the integration period, the value of the FIR pre-cursor tap coefficient may be decreased.

The following is one embodiment of an adaptive algorithm for use in determining values of Eint(i) to be used as update signals for updating the value of a pre-cursor tap coefficient. In one embodiment, the adaptive algorithm may be implemented using common logic elements and an up/down counter to integrate the value of the error information over a predetermined period of time. For example, functions e(i) and d(i) having values of 1 or −1 may be implemented as E(i) and D(i), having values of '0' or '1.' Using E(i) and D(i) in place of e(i) and d(i) and using separate expressions for the INC and DEC update directions, a FIR precursor tap coefficient may be determined based on the following equations:

$$Up(i)=[E(i-1)XNOR\ D(i-1)]XOR\ INC \quad (2)$$

$$Down(i)=[E(i-1)XNOR\ D(i-1)]XOR\ DEC, \quad (3)$$

where Up(i) and Down(i) are inputs to the up/down counter, and

Eint(i) is approximated by the output of the up/down counter after the predetermined period of time.

Figure 6:
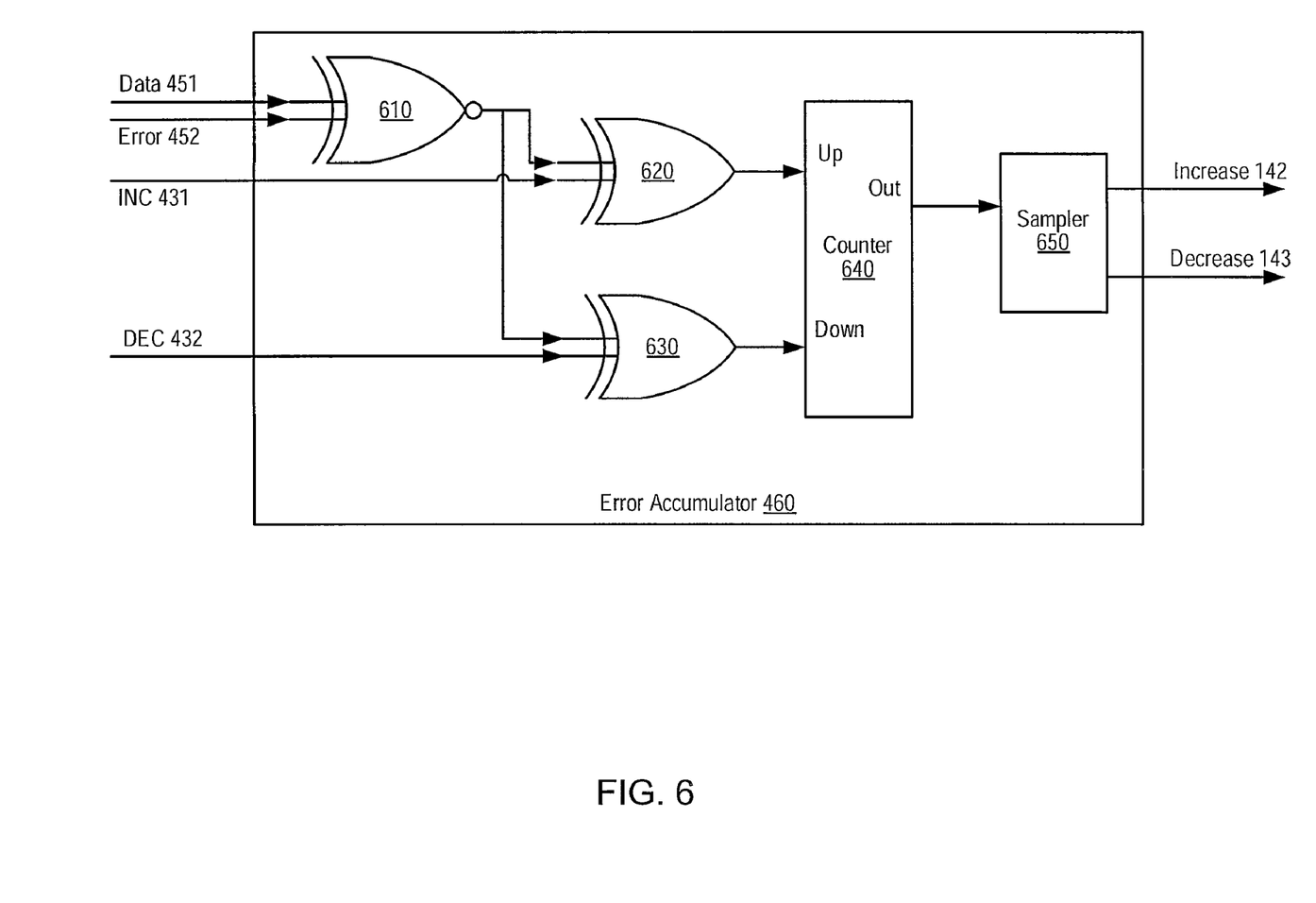
FIG. 6 illustrates one embodiment of an error accumulator.

FIG. 6 illustrates one embodiment of an error accumulator 460. In the illustrated embodiment, error accumulator 460 implements equations (2) and (3) as described above. Error accumulator 460 may include exclusive NOR gate (XNOR) 610, exclusive OR (XOR) gates 620 and 630, counter 640 and sampler 650. The value presented to the Up input of counter 640 is [error 452 XNOR data 451] XOR INC 431. The value presented to the Down input of counter 640 is [error 452 XNOR data 451] XOR DEC 432. Counter 640 may add the values of the Up and Down inputs for each clock cycle up to a predetermined integration period. For example, in one embodiment, counter 640 may accumulate samples of the Up and Down inputs for one million UI cycles, after which sampler 650 may sample the output of counter 640. If the output of counter 640 is positive at the end of the integration period, sampler 650 may convey a positive signal via increase 142, causing the value of the FIR pre-cursor tap coefficient to increase. If the output of counter 640 is negative at the end of the integration period, sampler 650 may convey a positive signal via decrease 143, causing the value of the FIR pre-cursor tap coefficient to decrease. A number of alternative embodiments are possible in which error accumulator 460 includes other components instead of or in addition to those illustrated, depending on factors such as the values and polarities of input signals and the implementation of the FIR filter in the transmitter.

Figure 7:
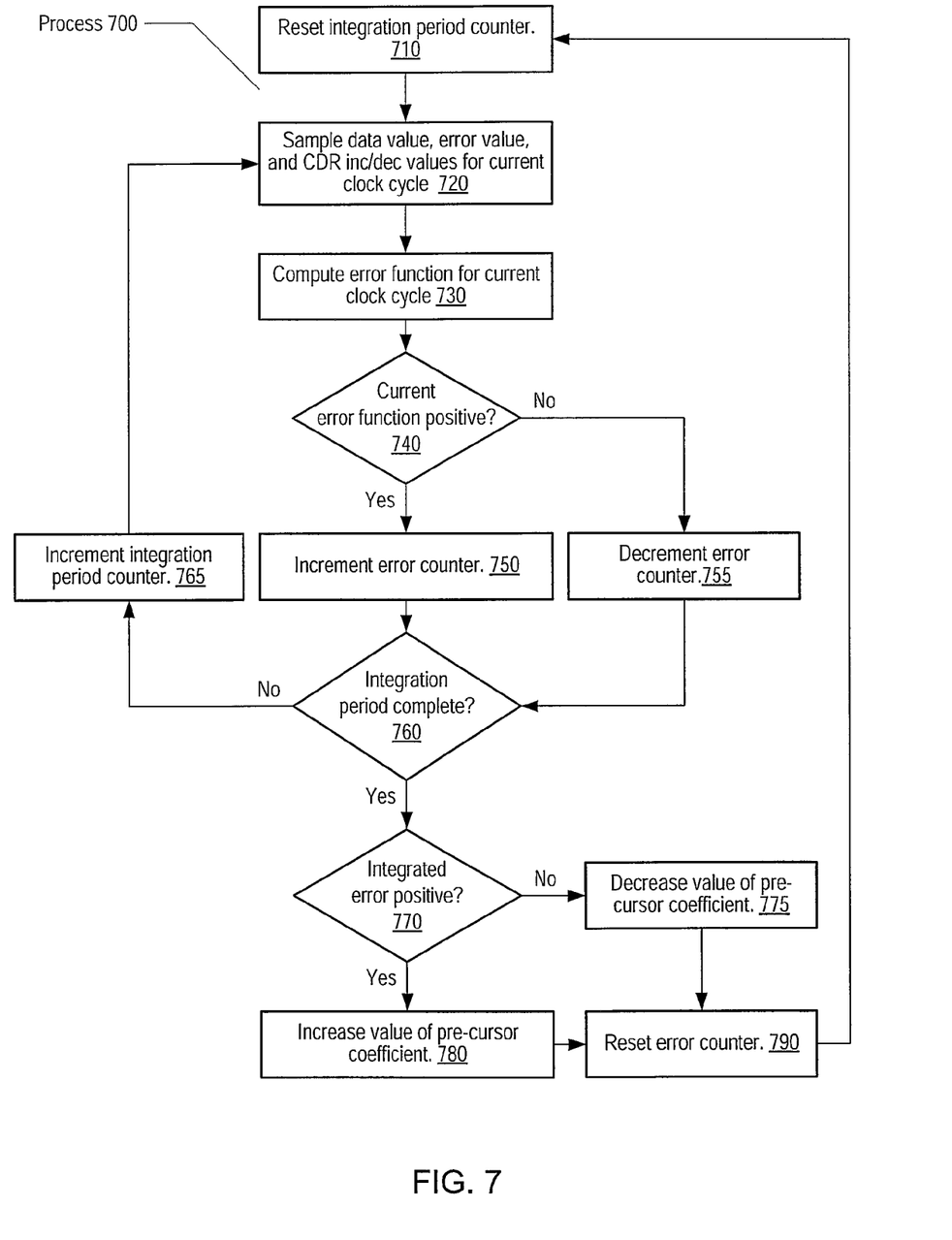
FIG. 7 illustrates one embodiment of a process that may be used to determine a value of a precursor tap coefficient of a FIR filter.

FIG. 7 illustrates one embodiment of a process 700 that may be used to determine a value of precursor tap coefficient of a FIR filter. Process 700 may begin with resetting an integration period counter (block 710). Next, samples may be taken during the current clock cycle from a data signal (block 720). The samples include the value of the data, an error sample, and values of clock recovery increment and decrement signals. Once these samples have been taken, an error function may be computed for the current clock cycle (block 730). If the error function is positive (decision block 740), an error counter may be incremented (block 750). If the error function is negative (decision block 740), an error counter may be decremented (block 755). Once the error counter has been incremented or decremented, if the integration period is not complete (decision block 760), the integration period counter may be incremented (block 765) and the data signal may be sampled again in the next clock cycle (block 720). If the integration period is complete (decision block 760), the integrated error function may be evaluated (decision block 770). If the integrated error function is negative, the value of the FIR pre-cursor tap coefficient may be decreased (block 775). If the integrated error function is positive, the value of the FIR pre-cursor tap coefficient may be increased (block 780). Once the value of the FIR pre-cursor tap coefficient has been updated, the error counter may be reset (block 790) and a new error function integration cycle started (block 710).

It is noted that the foregoing flow chart is for purposes of discussion only. In alternative embodiments, the elements depicted in the flow chart may occur in a different order, or in some cases concurrently. Additionally, some of the flow chart elements may not be present in various embodiments, or may be combined with other elements. All such alternatives are contemplated.

It is further noted that the above-described embodiments may comprise software. For example, the functionality of FIR 115 and receiver 120 may be implemented in hardware, software, firmware, or some combination of the above. In such embodiments, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A receiver configured to recover data from an input data signal, wherein the receiver comprises circuitry configured to:

receive a data signal, the data signal having been filtered by a finite impulse response (FIR) filter;

determine one or more update signals for a pre-cursor tap coefficient of the FIR filter;

convey the update signals to the FIR filter;

wherein to determine said update signals, the circuitry is configured to generate update signals based on one or more samples taken from the data signal; and use an adaptive algorithm to determine a sign of the update signals based on a slope at a locking point of a pulse response of a channel via which the data signal is received.

2. The receiver of claim 1, wherein the locking point is estimated to correspond to a peak amplitude of the pulse response.

3. The receiver of claim 1, wherein the receiver further includes a clock recovery unit configured to recover a clock from the data signal.

4. The receiver of claim 3, wherein to generate update signals, the circuitry is further configured to sample the data signal at a phase estimated to correspond to a peak amplitude of a pulse response of a channel via which the data signal is received, wherein the phase is based at least in part on the recovered clock.

5. The receiver of claim 4, wherein the update signals are configured to:
increase a pre-cursor tap coefficient setting, in response to determining that the phase corresponds to a point earlier than the peak amplitude of the pulse response of the channel; and
decrease a pre-cursor tap coefficient setting, in response to determining that the phase corresponds to a point later than the peak amplitude of the pulse response of the channel.

6. The receiver of claim 5, wherein to determine the phase, the circuitry is further configured to accumulate a series of error measurements taken from the data signal received via the channel.

7. The receiver of claim 1, wherein the receiver is integrated into a serializer/deserializer.

8. A method of recovering data from an input data signal, the method comprising:
receiving a data signal, the data signal having been filtered by a finite impulse response (FIR) filter;
determining update signals for a pre-cursor tap coefficient of the FIR filter, wherein said determining comprises generating pre-cursor tap coefficient update signals based on one or more samples taken from the data signal;
conveying the update signals to the FIR filter; and
using an adaptive algorithm to determine a sign of the update signals based on a slope at a locking point of a pulse response of a channel via which the data signal is received.

9. The method of claim 8, wherein the locking point is estimated to correspond to a peak amplitude of the pulse response.

10. The method of claim 8, further comprising recovering a clock from the data signal.

11. The method of claim 10, wherein generating update signals further comprises sampling the data signal at a phase estimated to correspond to a peak amplitude of a pulse response of the channel, wherein the phase is based on the recovered clock.

12. The method of claim 11, further comprising:
increasing a pre-cursor tap coefficient setting, in response to determining that the phase corresponds to a point earlier than the peak amplitude of the pulse response of the channel; and
decreasing a pre-cursor tap coefficient setting, in response to determining that the phase corresponds to a point later than the peak amplitude of the pulse response of the channel.

13. The method of claim 12, wherein determining the phase further comprises accumulating a series of error measurements taken from the data signal received via the channel.

14. A data communications system comprising:
a transmitter configured to convey a data signal filtered by a finite impulse response (FIR) filter; and
a receiver configured to:
receive the data signal;
determine update signals for a pre-cursor tap coefficient of the FIR filter; and
convey the update signals to the FIR filter;
wherein to determine said update signals, the receiver is configured to generate update signals based on one or more samples taken from the data signal and use an adaptive algorithm to determine a sign of the update signals based on a slope at a locking point of a pulse response of a channel via which the data signal is received.

15. The system of claim 14, wherein the locking point is estimated to correspond to a peak amplitude of the pulse response.

16. The system of claim 14, wherein the receiver further includes a clock recovery unit configured to recover a clock from the data signal.

17. The system of claim 16, wherein to generate update signals, the receiver is further configured to sample the data signal at a phase estimated to correspond to a peak amplitude of a pulse response of a channel via which the data signal is received, wherein the phase is based on the recovered clock.

18. The system of claim 17, wherein the update signals are configured to:
increase a pre-cursor tap coefficient setting, in response to determining that the phase corresponds to a point earlier than the peak amplitude of the pulse response of the channel; and
decrease a pre-cursor tap coefficient setting, in response to determining that the phase corresponds to a point later than the peak amplitude of the pulse response of the channel.

19. The system of claim 18, wherein to determine the phase, the receiver is further configured to accumulate a series of error measurements taken from the data signal received via the channel.

20. The system of claim 14, wherein the receiver is integrated into a serializer/deserializer.

* * * * *